Patented May 9, 1950

2,507,181

UNITED STATES PATENT OFFICE 2,507,181

N-ACYL DERIVATIVES OF POLYVINYLAMINE

Delbert D. Reynolds and William O. Kenyon, Rochester, N. Y., assignors to Eastman Kodak Company, Rochester, N. Y., a corporation of New Jersey No Drawing. Original application October 30, 1945, Serial No. 625,690. Divided and this application March 13, 1947, Serial No. 734,566

7 Claims. (Cl. 260—89.7)

This application relates to N-acyl derivatives of polyvinylamine.

This application is a division of our copending application, Serial No. 625,690, filed October 30, 1945 (now United States Patent 2,484,423, dated October 11, 1949).

It is known that simple monomeric amines can be obtained by the Gabriel synthesis, wherein an N-substituted phthalimide is hydrolyzed with a strong mineral acid or an inorganic base at high temperatures and under pressure to form primary amines and phthalic acid. Under these conditions the reaction is not clean cut and produces considerable by-products admixed with the desired amine. Usually the amine product can be separated and purified by methods of distillation, crystallization, extraction, and the like. In polymer chemistry, however, the isolation of the desired product by such common methods is not possible. In order to obtain a pure resin on a structural basis, the reaction must go to completion along the desired path. Otherwise residual or partially reacted groups will still be a part of the polymer molecule and cannot be separated therefrom by physical methods. Obviously, the usual conditions of the Gabriel synthesis cannot be employed for the preparation of pure polymeric amines and the N-acyl derivatives thereof.

However, polymeric products containing substantial portions of amino groups have been prepared by other methods from polymeric N-vinylimides, for example, from polyvinylphthalimide and from polyvinylsuccinimide by subjecting said polymers to hydrolysis in the presence of strong mineral acids and strong inorganic and organic bases. The products of this type of hydrolysis, in all instances, had only a portion of the nitrogen combined in the form of amino nitrogen. In one example, polyvinylsuccinimide reacting with hydrochloric acid under mild conditions gave a gelatinous material, while the concentrated acid at high temperatures gave a compound having but 75 per cent of the nitrogen present as amino nitrogen, and with ethanolamine, a product containing both free amino and free carboxyl groups. In other words, a pure polymeric vinylamine from which polyvinyl acylamides might have been prepared had not been obtained, but only a polymer containing up to 75 per cent of the nitrogen present in the form of —NH₂ groups and the balance of the nitrogen in the form of incompletely hydrolyzed imide groups.

In another example, the hydrolysis of polyvinylphthalimide with hydrobromic acid in phenol gave a product which was soluble in both acids and bases, indicating thereby the presence of a substantial number of free amino and free carboxyl groups in the product, while polyvinylsuccinimide hydrolyzed with concentrated hydrochloric acid, gave a dark-brown solid which had a total nitrogen content by the Kjeldahl method of 16.95 per cent, and an amino nitrogen content by the Van Slyke method of 12.65 per cent. The hydrolyzed product consisted, therefore, of approximately 75 per cent free amino groups and 25 per cent of incompletely hydrolyzed imide groups. The hydrolysis of polyvinylsuccinimide with ethanolamine gave a hydrolytic product having but 40 per cent of the nitrogen in the form of primary amine groups.

We have now found that substantially pure polyvinylamine salts and N-acyl derivatives thereof can be prepared from polyvinyl cyclic imides containing from 5 to 6 atoms in the ring and having the general formula:

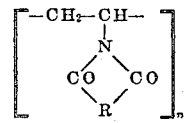

wherein R represents a divalent organic radical, for example, ethylene group, 1,2-propylene group, 1,2-phenylene group, or said groups substituted in the free positions by one or more alkyl, alkoxy, phenyl, carbethoxy, or halogen, by first reacting the polyvinyl cyclic imide with hydrazine hydrate to form a substituted cyclic hydrazide of a phthalic acid, and then treating this compound with an acid, for example, hydrochloric, hydrobromic, glacial acetic, alpha-chloropropionic or bromobenzoic acid, to obtain the corresponding salts of polyvinylamine admixed with a phthalyl hydrazide, from which mixture we have been able to isolate practically pure polyvinylamine salts, that is, a polyvinylamine salt wherein at least 90 per cent by weight of the total nitrogen present is in the form of amino nitrogen and the remainder of the nitrogen is in the form of incompletely hydrolyzed imide groups. The acylamides are prepared by treating the reaction product of the polyvinyl cyclic imide and hydrazine hydrate with an acylating reagent. The new polyvinyl acylamides of our invention are valuable intermediates and materials for film base and synthetic fibers.

The intermediate polyvinyl cyclic imides employed in our invention can be obtained by pyrolysis of the N-(beta-acyloxyethyl) derivatives of cyclic imides containing 5 to 6 atoms in the ring and having the general formula:

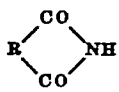

wherein R represents a divalent organic radical as previously defined. There can be prepared by this method, for example, polyvinylphthalimide from N-(beta-acetoxyethyl) phthalimide, polyvinylsuccinimide from N-(beta-acetoxyethyl) succinimide, polyvinylglutarimide from N-(beta-acetoxyethyl) glutarimide.

It is, accordingly, an object of our invention to provide new N-acyl derivatives of polyvinylamine. Other objects will become apparent hereinafter.

The following examples will serve to illustrate our new compounds and the manner of obtaining the same.

*Example 1.—Preparation of polyvinyl acetamide*

100 grams (0.58 mol.) of polyvinylphthalimide were refluxed in 150 cc. of 85 per cent hydrazine hydrate (2.67 mol). The imide dissolved completely and then a mass of crystalline material separated out of solution. Water was added and heat applied, until solution was again complete. A white, fibrous material was obtained by precipitating the solution in ethanol. The fibrous material was leached in fresh ethanol, and dried at 60° C. The yield was 69 grams. This intermediate polymer was ground to 40 mesh, added to 180 c. c. of acetic anhydride and refluxed for 45 minutes. On cooling, a crystalline material began to separate out of the clear solution. The mixture was poured into an excess of acetone, whereby the crystalline material dissolved and a white resin was precipitated. Analysis of the resin gave by weight 15.62 per cent nitrogen, 8.12 per cent hydrogen, and 55.10 per cent carbon compared to theoretical calculated for polyvinyl acetamide having the formula

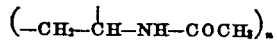

of 16.5 per cent nitrogen, 8.24 per cent hydrogen and 56.5 per cent carbon. In place of acetic anhydride in the above example, there can be substituted other acyl anhydrides, for example, propionic, butyric, phenoxyacetic and benzoic acid anhydrides to give corresponding acylamides of polyvinylamine. Similarly, there can be substituted for polyvinylphthalimide in the above example, other polyvinyl cyclic imides such as polyvinylsuccinimide, polyvinyl glutarimide, and their simpler substitution products.

*Example 2.—Preparation of polyvinyl benzamide*

20 grams of polyvinylamine hydrobromide were dissolved in 250 c. c. of water. To this solution, there was added 13 grams of sodium hydroxide dissolved in 100 c. c. of water. The resulting solution was stirred while 25 grams of benzoyl chloride were slowly added. A white granular resin separated out of solution. The reaction mixture was stirred for a period of three hours. The precipitate was separated from the solution, washed thoroughly with water and dried. It was then dissolved in methanol and precipitated in water. After thorough drying at 60° C., the dry resin was leached in dry acetone. A sample dried at 70° C. in vacuum contained 9.41 per cent by weight of nitrogen by the Dumas method compared with the theoretical calculated value of 9.52 per cent for polyvinyl benzamide having the formula

The polyvinyl benzamide was soluble in methanol, ethanol, acetone-water mixture or dioxane-water mixture and insoluble in dry acetone, dry dioxane or water.

What we claim is:

1. A process for preparing an acylamide of polyvinylamine which comprises reacting a polyvinyl cyclic imide selected from the group consisting of polyvinylphthalimide, polyvinylsuccinimide and polyvinylglutarimide with hydrazine hydrate, precipitating the reaction mixture in ethanol and separating the resinous solid which forms, acylating the said resinous solid by reacting it with a carboxylic acid anhydride selected from the group consisting of the anhydride of a saturated fatty acid containing from 2 to 4 carbon atoms and benzoic anhydride, precipitating the acylation reaction mixture in acetone and separating the precipitate of polyvinyl acylamide which forms.

2. A process for preparing polyvinyl acetamide which comprises reacting polyvinylphthalimide with hydrazine hydrate, precipitating the reaction mixture in ethanol and separating the resinous solid which forms, acetylating the said resinous solid by reacting it with acetic anhydride, precipitating the acetylation reaction mixture in acetone and separating the precipitate of polyvinyl acetamide which forms.

3. A process for preparing polyvinyl butyramide which comprises reacting polyvinylphthalimide with hydrazine hydrate, precipitating the reaction mixture in ethanol and separating the resinous solid which forms, acylating the said resinous solid by reacting it with n-butyric anhydride, precipitating the acylation reaction mixture in acetone and separating the precipitate of polyvinyl butyramide which forms.

4. A process for preparing polyvinyl benzamide which comprises reacting polyvinylphthalimide with hydrazine hydrate, precipitating the reaction mixture in ethanol and separating the resinous solid which forms, acylating the said resinous solid by reacting it with benzoic anhydride, precipitating the acylation reaction mixture in acetone and separating the precipitate of polyvinyl benzamide which forms.

5. A process for preparing polyvinyl acetamide which comprises reacting polyvinyl phthalimide with hydrazine hydrate, in the ratio of 2.67 moles of the hydrazine hydrate to each 0.58 mole of the polyvinyl phthalimide, precipitating the reaction mixture in ethanol and separating the resinous solid which forms, acetylating the said resinous solid by reacting it with acetic anhydride, precipitating the acetylation reaction mixture in acetone and separating the precipitate of polyvinyl acetamide which forms.

6. A process for preparing polyvinyl butyramide which comprises reacting polyvinylphthalimide with hydrazine hydrate, in the ratio of 2.67 moles of the hydrazine hydrate to each 0.58 mole of the polyvinylphthalimide, precipitating the reaction mixture in ethanol and separating the resinous solid which forms, acetylating the said resinous solid by reacting it with n-butyric anhydride, precipitating the acylation reaction mixture in acetone and separating the precipitate of polyvinyl butyramide which forms.

7. A process for preparing polyvinyl benzamide which comprises reacting polyvinylphthalimide with hydrazine hydrate, in the ratio of 2.67 moles of the hydrazine hydrate to each 0.58 mole of the polyvinylphthalimide, precipitating the reaction mixture in ethanol and separating the resinous solid which forms, acetylating the said resinous solid by reacting it with benzoic anhydride, precipitating the acylation reaction mixture in acetone and separating the precipitate of polyvinyl benzamide which forms.

DELBERT D. REYNOLDS.
WILLIAM O. KENYON.

REFERENCES CITED

The following references are of record in the file of this patent:

UNITED STATES PATENTS

| Number | Name | Date |
|---|---|---|
| 2,231,905 | Hanford et al. | Feb. 18, 1941 |
| 2,365,340 | Hanford et al. | Dec. 19, 1944 |
| 2,402,136 | Hanford et al. | June 18, 1946 |

OTHER REFERENCES

V. Richter: "Organic Chemistry," vol. 1, page 274, published by Blakiston, Philadelphia, 2nd Eng. ed.

Ing et al.: "A modification of the Gabriel synthesis of amines," Journal of the Chemical Society, 1926, pages 2348–2351.

Jones et al.: "Attempted preparation of polyvinylamine," Journal of Organic Chemistry, Nov. 1944, pages 500–512.

Reynolds et al.: "The preparation of polyvinylamine, etc.," Journal of the American Chemical Soc., vol. 69, pages 911–915, Apr. 1947.